United States Patent
Kitamura (10) Patent No.: US 12,429,461 B2
(45) Date of Patent: Sep. 30, 2025

(54) DEFECT DETECTION DEVICE AND DEFECT DETECTION METHOD

(71) Applicant: SHIMADZU CORPORATION, Kyoto (JP)

(72) Inventor: Masuto Kitamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 501 days.

(21) Appl. No.: 17/969,661

(22) Filed: Oct. 19, 2022

(65) Prior Publication Data
US 2023/0125289 A1    Apr. 27, 2023

(30) Foreign Application Priority Data
Oct. 25, 2021   (JP) ................. 2021-173707

(51) Int. Cl.
  *G01N 29/24*   (2006.01)
  *G01N 29/04*   (2006.01)
  *G01N 29/34*   (2006.01)
  *H04N 23/63*   (2023.01)

(52) U.S. Cl.
  CPC ....... *G01N 29/2418* (2013.01); *G01N 29/045* (2013.01); *G01N 29/348* (2013.01); *G01N 2291/023* (2013.01); *G01N 2291/0289* (2013.01); *H04N 23/63* (2023.01)

(58) Field of Classification Search
  CPC ............ G01N 29/2418; G01N 29/045; G01N 29/348; G01N 2291/023; G01N 2291/0289; G01N 29/42; H04N 23/63
  See application file for complete search history.

(56) References Cited

U.S. PATENT DOCUMENTS

| | | | | |
|---|---|---|---|---|
| 4,542,644 | A | * | 9/1985 | Claytor ................... G01F 1/663 73/599 |
| 2017/0350690 | A1 | | 12/2017 | Hatahori et al. |
| 2018/0283847 | A1 | * | 10/2018 | Hatahori ............. G01N 29/043 |
| 2020/0191751 | A1 | * | 6/2020 | Hatahori ................. G01H 9/00 |

FOREIGN PATENT DOCUMENTS

| | | |
|---|---|---|
| CN | 108760878 | 11/2018 |
| JP | 2017219318 | 12/2017 |
| JP | 2020098109 | 6/2020 |
| WO | 2021145034 | 7/2021 |

OTHER PUBLICATIONS

"Office Action of Japan Counterpart Application", issued on Apr. 22, 2025, with English translation thereof, p. 1-p. 8.
"Office Action of China Counterpart Application", issued on Jun. 19, 2025, with English translation thereof, pp. 1-15.

* cited by examiner

*Primary Examiner* — Tarun Sinha
(74) *Attorney, Agent, or Firm* — JCIPRNET (57) ABSTRACT

An exciter (11, 12) induces an elastic wave in a test object by sequentially giving the object multiple kinds of vibrations having different frequencies. An illuminator (13, 14) performs stroboscopic illumination on a measurement area on the surface of the object. A displacement measurer (15) controls the timing of the stroboscopic illumination with respect to the phase of the elastic wave for each kind of vibration to perform a batch measurement of the displacements, in the off-plane direction of the surface, of the points within the measurement area at least at three different phases of the elastic wave, using speckle interferometry or speckle-shearing interferometry.

5 Claims, 6 Drawing Sheets

DEFECT DETECTION DEVICE AND DEFECT DETECTION METHOD

CROSS-REFERENCE TO RELATED APPLICATION

This application claims the priority benefits of Japanese application no. 2021-173707, filed on Oct. 25, 2021. The entirety of the above-mentioned patent application is hereby incorporated by reference herein and made a part of this specification.

TECHNICAL FIELD

The present invention relates to a defect detection device and defect detection method.

BACKGROUND ART

As a method for detecting a defect on or in a concrete structure, steel structure or similar object to be examined (which is hereinafter called a "test object"), a method which employs speckle interferometry or speckle-shearing interferometry has been commonly known. In speckle interferometry, a beam of laser light from a laser light source is split into illumination light and reference light, and the surface of the test object is illuminated with the illumination light in a stroboscopic manner. The illumination light reflected at each point on that surface is combined with the reference light to obtain an interference pattern. In speckle-shearing interferometry, the stroboscopic illumination on the surface of the test object is performed with the laser light from the laser source (without using reference light), and an interference pattern is obtained from two rays of light reflected from two points located close to each other on that surface.

In a defect detection device described in Patent Literature 1, a vibration is given to the test object to inject an elastic wave. An image of the interference pattern obtained by speckle interferometry or speckle-shearing interferometry is taken with a CCD camera (or the like) before and after the injection of the elastic wave. From these two images, the distribution of the displacements or relative displacements of the surface of the test object in the direction perpendicular to the surface ("off-plane direction") is calculated. A discontinuity in the displacement or relative displacement occurs at the location where a defect is present on or in the test object, thereby enabling the detection of the defect.

CITATION LIST

Patent Literature

Patent Literature 1: JP 2017-219318 A
Patent Literature 2: WO 2021/145034 A

The vibration given to the test object should have a lower frequency (or longer wavelength) for increasing its amplitude so as to obtain a high signal-to-noise ratio, whereas it should have a higher frequency (or shorter wavelength) for the detection of a smaller defect. Accordingly, the appropriate frequency of the vibration varies depending on the size of the defect. However, the appropriate frequency cannot be determined before the measurement since the size of the defect is unknown before the measurement. Therefore, with a conventional defect detection device, an image of the interference pattern is acquired at each of the plurality of frequencies, and the user selects an appropriate one from those images. This requires the user to consume time and labor for the operation of setting a frequency every time the frequency is changed.

The present invention provides a defect detection device and method which allow the user to perform measurements without being required to consume time and labor for the frequency-setting operation for each frequency.

SUMMARY OF INVENTION

The defect detection device according to the present invention includes:
an exciter configured to induce elastic waves in a test object by sequentially giving the test object a plurality of kinds of vibrations whose frequencies are different from each other;
an illuminator configured to perform stroboscopic illumination on a measurement area on the surface of the test object; and
a displacement measurer configured to control the timing of the stroboscopic illumination and the phase of the elastic wave for each of the plurality of kinds of vibrations so as to perform a batch measurement of displacements, in the off-plane direction of the surface, of the points within the measurement area at least at three phases of the elastic wave which are different from each other, using speckle interferometry or speckle-shearing interferometry.

The defect detection method according to the present invention includes:
a frequency-setting process for setting a plurality of frequencies which are different from each other;
an excitation process for inducing an elastic wave in a test object by giving a vibration having one of the plurality of frequencies to the test object;
an illumination process for performing stroboscopic illumination on a measurement area on the surface of the test object; and
a displacement measurement process for controlling the timing of the stroboscopic illumination and the phase of the elastic wave so as to perform a batch measurement of displacements, in the off-plane direction of the surface, of the points within the measurement area at least at three phases of the elastic wave which are different from each other, using speckle interferometry or speckle-shearing interferometry,
where the excitation process, the illumination process and the displacement measurement process are sequentially performed for each of the plurality of frequencies after the frequency-setting process is performed.

In the defect detection device and method according to the present invention, a plurality of frequencies which are different from each other are previously set. A plurality of kinds of vibrations having those frequencies which are different from each other are sequentially given to the test object so as to obtain, for each frequency, the displacement in the off-plane direction of each point within the measurement area on the surface of the test object. Therefore, the user does not need to perform the frequency-setting operation for each frequency, so that the time and labor of the user can be reduced. As for the setting of the plurality of frequencies, the user may enter and set all frequencies at one time before the measurement is initiated, or those frequencies may be set beforehand without requiring entry by the user.

DESCRIPTION OF EMBODIMENTS

An embodiment of the defect detection device and method according to the present invention is hereinafter described, using FIGS. 1-6.

(1) Configuration of Defect Detection Device According to Present Embodiment

Figure 1:
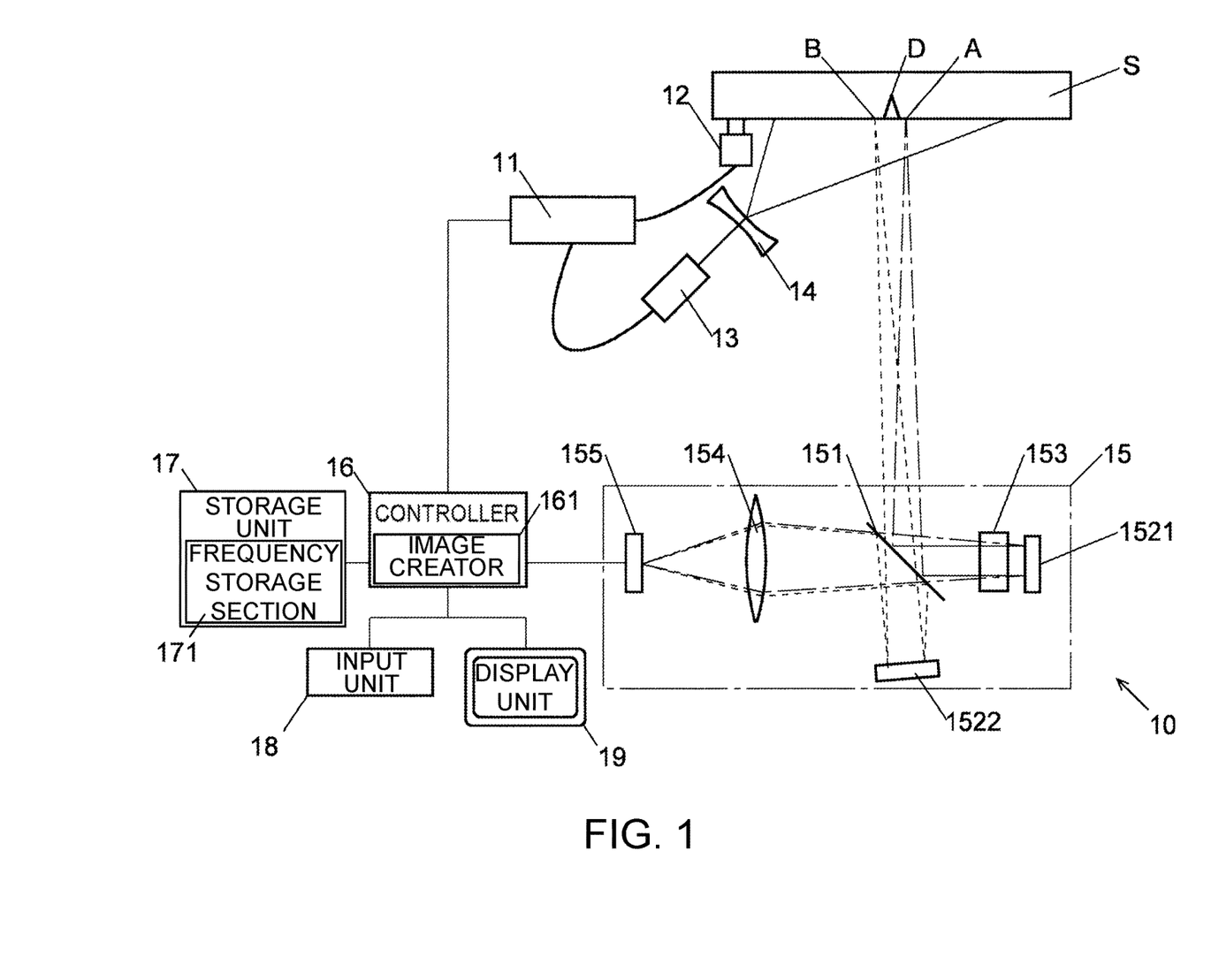
FIG. 1 is a schematic configuration diagram showing one embodiment of the defect detection device according to the present invention.

FIG. 1 is a schematic configuration diagram of a defect detection device 10 according to the present embodiment. This defect detection device 10 includes a signal generator 11, vibrator 12, pulse laser light source 13, illumination light lens 14, speckle-shearing interferometer 15, controller 16, storage unit 17, input unit 18 and display unit 19.

The signal generator 11, which is connected with the vibrator 12 by a cable, generates an AC electric signal and send it to the vibrator 12. The frequency of this AC electric signal can be varied and will be set by the controller 16 for each measurement, as will be described later. When in use, the vibrator 12 is held in contact with a test object S, receives the AC electric signal from the signal generator 11 and converts it into a mechanical vibration having the aforementioned frequency, to give the mechanical vibration to the test object S. In this manner, an elastic wave having the aforementioned frequency, i.e., the frequency set by the controller 16, is induced in the test object S. The signal generator 11 and the vibrator 12 correspond to the aforementioned exciter.

The signal generator 11 is also connected with the pulse laser light source 13 by a cable separate from the cable connected to the vibrator 12. The signal generator 11 sends a pulsed electric signal (pulse signal) to the pulse laser light source 13 at a timing when the AC electric signal is at a predetermined phase. As will be described later, the predetermined phase, and the thereby determined timing, are changed during the defect examination process. The pulse laser light source 13 is a light source configured to emit pulse laser light upon receiving a pulse signal from the signal generator 11. The illumination light lens 14 is a concave lens located between the pulse laser light source 13 and the test object S. The illumination light lens 14 serves to expand the pulse laser light from the pulse laser light source 13 onto the entire measurement area on the surface of the test object S. The pulse laser light source 13 and the illumination light lens 14 form a system for performing stroboscopic illumination on the surface of the test object S at the aforementioned timing. This system corresponds to the aforementioned illuminator.

The speckle-shearing interferometer 15 corresponds to the aforementioned displacement measurer. It includes a beam splitter 151, first reflector 1521, second reflector 1522, phase shifter 153, converging lens 154 and image sensor 155. The beam splitter 151 is a half mirror located at a position where it can receive the illumination light reflected by the measurement area on the surface of the test object S. The first reflector 1521 is located on the optical path of the illumination light reflected by the beam splitter 151, while the second reflector 1522 is located on the optical path of the illumination light passing through the beam splitter 151. The phase shifter 153, which is located between the beam splitter 151 and the first reflector 1521, is configured to change (shift) the phase of the light passing through the phase shifter 153. The image sensor 155 is located on an optical path which is common to both the illumination light which is initially reflected by the beam splitter 151 and subsequently by the first reflector 1521 to ultimately pass through the beam splitter 151, and the illumination light which initially passes through the beam splitter 151 and is subsequently reflected by the second reflector 1522 to be ultimately reflected by the beam splitter 152. The converging lens 154 is located between the beam splitter 151 and the image sensor 155.

The first reflector 1521 is arranged so that its reflecting surface is at an angle of 45 degrees to the reflecting surface of the beam splitter 151. On the other hand, the second reflector 1522 is arranged so that its reflecting surface is slightly tilted from the angle of 45° to the reflecting surface of the beam splitter 151. Due to this arrangement of the first reflector 1521 and the second reflector 1522, the illumination light (indicated by the long dashed short dashed line in FIG. 1) which is reflected by point A on the surface of the test object S and also by the first reflector 1521 hits the same point on the image sensor 155 as the illumination light (indicated by the broken line) which is reflected by point B, which is slightly displaced from point A on the surface, and also by the second reflector 1522, whereby interference of light occurs. The image sensor 155, which has a large number of detection elements, detects rays of light coming from a large number of points (represented by point A mentioned earlier) on the surface of the test object S and falling onto the image sensor 155 via the first reflector 1521 and the phase shifter 153, with each ray of light detected by a different detection element. The same also applies to point B: each of the rays of light coming from a large number of points and falling onto the image sensor 155 via the second reflector 1522 is detected by a different detection element.

The storage unit 17 is used to store detection signals obtained from each detection element of the image sensor 155 as well as data obtained by processing those signals by the controller 16. Additionally, a frequency storage section 171 is provided in the storage unit 17. The frequency storage section 171 records a plurality of frequencies which a user enters through the input unit 18. Instead of being entered by a user, the plurality of frequencies may be entered beforehand by the manufacturer of the defect detection device 10. A rewritable record medium, such as a hard disk or SSD (solid state drive), is used as the storage unit 17, although a non-rewritable (read-only) storage device may be used for the frequency storage section 171 in the case where the plurality of frequencies are entered beforehand by the manufacturer of the defect detection device 10.

The input unit 18 is an input device, such as a keyboard or touch panel, to be used by a user in entering the plurality of frequencies and other measurement conditions. The display unit 19 is a display for showing various screens, such as a setting screen including input fields for the plurality of frequencies and other items of information, or a screen for showing measured results.

The controller 16 performs various operations, including the operation of displaying various forms of information on the display unit 19, such as an image showing the setting screen or measured results, the operation of storing the plurality of frequencies entered through the input unit 18 and other measurement conditions in the storage unit 17 including the frequency storage section 171, the operation of reading the plurality of frequencies from the frequency storage section 171 and controlling the signal generator 11 to sequentially generate signals with those frequencies, as well as the operation of performing data processing based on the detection signals obtained from each detection element of the image sensor 155. The controller 16 is embodied by the CPU and other hardware devices as well as software components for performing the aforementioned operations. A functional block which performs the operation of displaying an image showing a measured result on the display unit 19, among the operations performed by the controller 16, is hereinafter called the "image creator 161".

(2) Operation of Defect Detection Device According to Present Embodiment, and Defect Detection Method According to Present Embodiment An operation of the defect detection device 10 according to the present embodiment, and the defect detection method according to the present embodiment, are hereinafter described, using FIGS. 2-5.

Figure 2:
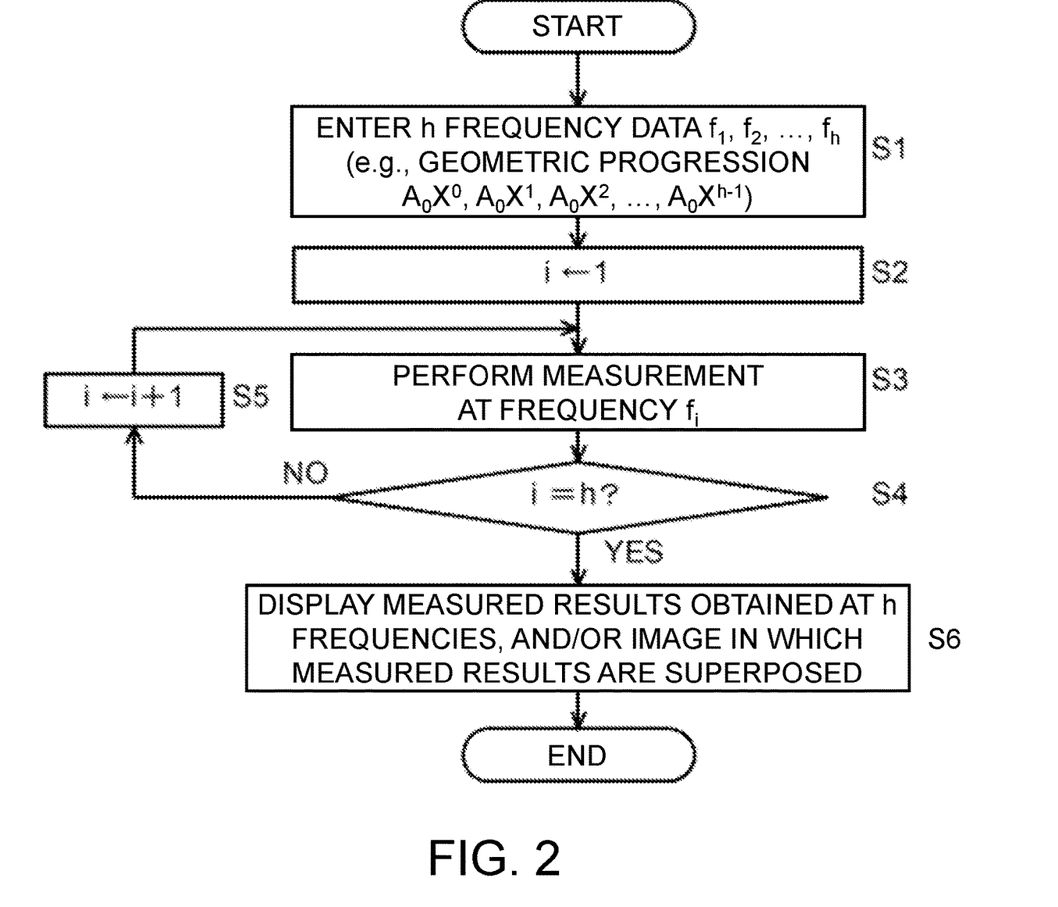
FIG. 2 is a flowchart showing the overall operation of the defect detection device according to the present embodiment.

Initially, a user performs a predetermined operation using the input unit 18, whereupon a sequence of operations is initiated according to the flowchart shown in FIG. 2. The controller 16 controls the display unit 19 to display an input field which allows for an input of a plurality of numerical values of the frequency, along with the frequency range that can be entered (which is a frequency range of the vibration that the signal generator 11 can generate; for example, 20 kHz to 400 kHz). The user determines a plurality of numerical values within the displayed frequency range and enters them into the input field (Step 1: frequency-setting process). As for the number of numerical values to be entered, the defect detection method according to the present embodiment requires at least two values, while no upper limit of the number is specified. Depending on the situation, entering a single numerical value of the frequency may be sufficient, as in the case of reperforming a measurement of a test object S for which the measurement has already been performed before. In that case, the defect detection method according to the present embodiment will not be carried out; a defect detection method similar to a conventional method will be performed. After the required number of numerical values have been entered, the user performs a predetermined operation, such as clicking an "Entry Done" button on the screen, to complete the operation of entering the numerical values of the frequency.

Entering lower frequencies in this step results in larger magnitudes of the vibration and improves the signal-to-noise ratio, whereas setting higher frequencies makes it easier to detect smaller defects. Accordingly, when it is expected that comparatively large defects are present in the test object S, the user can give priority to the entry of small numerical values. When it is expected that comparatively small defects are present in the test object S, the user can give priority to the entry of large numerical values. When it is impossible to predict the size of the defect that is possibly present, the user can enter a wide range of numerical values. Additionally, it is commonly known that, when the same amount of vibration energy is given to the test object S, the rate of change in the amplitude with respect to the frequency is inversely proportional to the frequency. Therefore, the amplitude values can be set at almost equal intervals by determining the aforementioned frequencies by a plurality of terms of a single geometric progression, i.e., $A_i=A_0X^0, A_0X^1, A_0X^2 \ldots, $ and $A_0X^{h-1}$, where $A_0$ is the first term and X is the common ratio.

In Step 1, when the user enters numerical values of the frequency, one or a plurality of sets of numerical values may be displayed as entry candidates on the display unit 19. The user may select the one set of numerical values, or one of the plurality of sets of numerical values, to enter the numerical values of the frequency, or may also enter numerical values of the frequency other than the entry candidates. The entry candidates may be previously determined and stored in the storage unit 17, or they may be determined based on a preliminary experiment performed on the test object S. For example, in the preliminary experiment, an AC electric signal for giving a vibration to the test object S is sent from the signal generator 11 to the vibrator 12 at each of a plurality of frequencies, to determine a plurality of frequencies at which the phase difference between the voltage and current of the AC electric signal is equal to or smaller than a predetermined value, or a frequency at which the phase difference is smallest. When a plurality of frequencies at which the phase difference is equal to or smaller than a predetermined value have been determined, the set of frequencies are designated as entry candidates. When a frequency at which the phase difference is smallest has been determined, a plurality of frequencies determined by a geometric progression including that frequency as one of the terms (e.g., as the lowest frequency) can be designated as entry candidates.

As another possibility, in Step 1, one set of numerical values determined by a similar preliminary experiment to the previously described one may be directly set as the plurality of frequencies, without prompting the user to enter numerical values of the frequency. Furthermore, one set of numerical values stored beforehand in the storage unit 17 may be directly set as the plurality of frequencies, without prompting the user to enter numerical values of the frequency.

Figure 3:
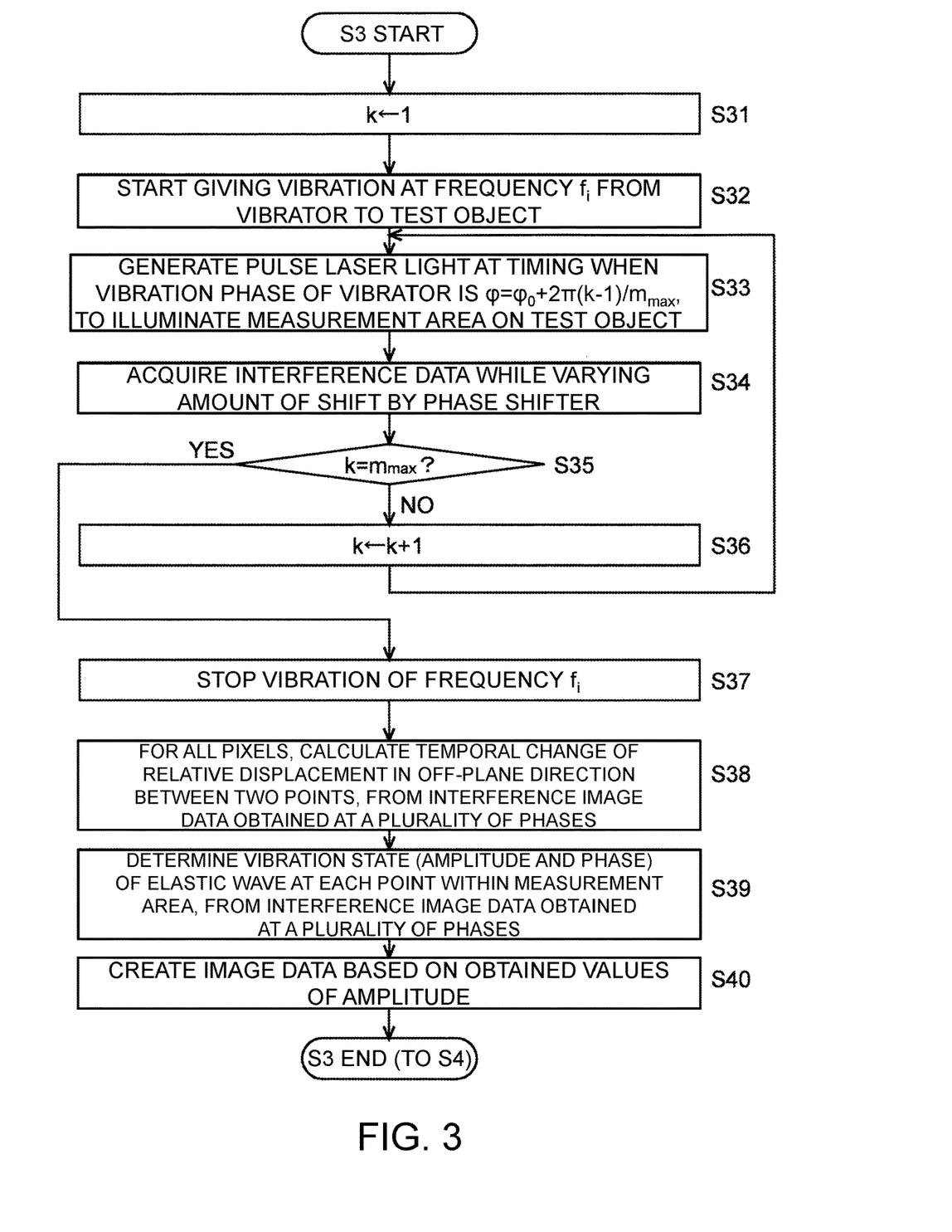
FIG. 3 is a flowchart showing the operation of the measurement at each individual frequency in the operation of the defect detection device according to the present embodiment.

After the plurality of frequencies have been set in the previously described manner, the iterator i=1 (Step 2) and frequency $f_i=f_1$ are set, and the measurement is performed, (Step 3). In Step 3, as shown in the flowchart of FIG. 3, the measurement of the surface displacement is performed multiple times (which is hereinafter represented as $m_{max}$ times, where $m_{max} \geq 3$), using a different phase of the vibration of the vibrator 12 each time. The "phase of the vibration of the vibrator 12" is the phase of the AC electric signal sent from the signal generator 11 to the vibrator 12. It corresponds to the phase of the elastic wave induced in the test object S at the point where the vibrator 12 is in contact with the object S. Each of the measurements of the surface displacement is referred to as the "k-th measurement", using a numerical value k (which is a natural number from 1 to $m_{max}$). The following description deals with the case of $m_{max}=3$, which is the simplest example (a case with $m_{max}$ greater than three will be described later).

The value of k is initially set to 1 (Step 31), and an AC electric signal with frequency $f_i$ (which is $f_1$ at this stage since i=1) is sent from the signal generator 11 to the vibrator 12, whereby the operation of giving the vibration of frequency $f_i$ to the test object S is initiated (Step 32). An elastic wave with frequency $f_i$ is thereby induced, and a simple harmonic oscillation occurs in the test object S.

Next, at each timing when the phase of the vibration of the vibrator 12 is expressed by $[\phi_0+2\pi((k-1)/m_{max})]$ using $\phi_0$ which represents a predetermined initial value (e.g., $\phi_0$=0), the signal generator 11 transmits a pulse signal to the pulse laser light source 13. Since k=1 at this stage, the vibration of the vibrator 12 at the timing of the transmission of the pulse signal has a phase of $\phi_0$. The pulse laser light source 13 repeatedly emits illumination light, which is a pulsed laser light, every time it receives the pulse signal. This illumination light is expanded by the illumination light lens 14 and illuminates the entire measurement area on the surface of the test object S (Step 33).

The illumination light is reflected on the surface of the test object S and enters the beam splitter 151 in the speckle-shearing interferometer 15. A portion of this illumination light is reflected by the beam splitter 151 and passes through the phase shifter 153. After being reflected by the first reflector 1521, the same light once more passes through the phase shifter 153, and a portion of this light passes through the beam splitter 151 and falls onto the image sensor 155. The remaining portion of the illumination light which entered the beam splitter 151 for the first time passes through the beam splitter 151. After being reflected by the second reflector 1522, a portion of this light is reflected by the beam splitter 151 and falls onto the image sensor 155. In the image sensor 155, each of the rays of illumination light reflected by a large number of points on the surface of the test object S is individually detected by a different detection element.

Figure 4:
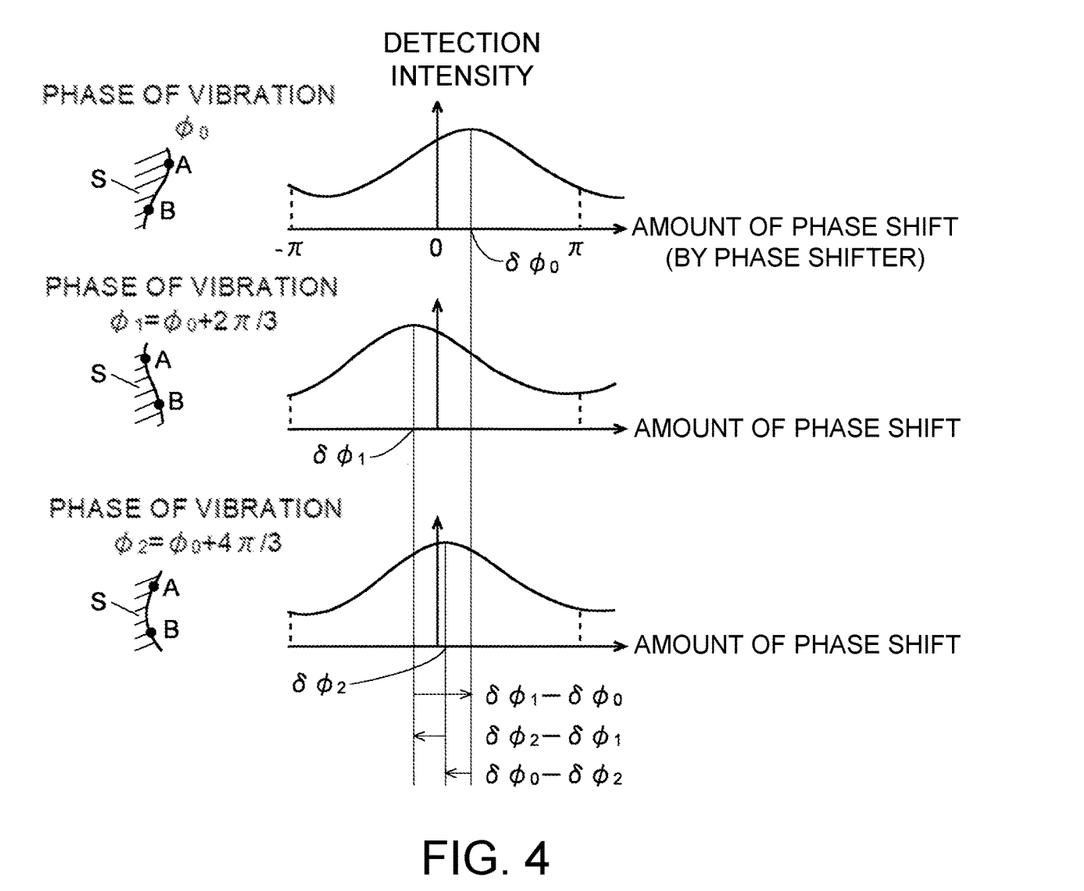
FIG. 4 is a diagram for explaining a method for determining the displacement of the surface of a test object in the defect detection device according to the present embodiment.

While the illumination light, which is a pulsed laser light, is repeatedly emitted, the phase shifter 153 is operated to gradually change (shift) the phase of the illumination light passing through the phase shifter 153 (i.e., the illumination light reflected by point A). Consequently, the phase difference between the illumination light reflected by point A and the one reflected by point B gradually changes. During this change, each detection element of the image sensor 155 detects the intensity of the interference light resulting from the interference of the two rays of illumination light (Step 34). The upper diagram in FIG. 4 graphically shows one example of the amount of phase shift by the phase shifter 153 and the intensity of the interference light detected with a detection element of the image sensor 155 when the phase of the vibration of the vibrator 12 is $\phi_0$. In FIG. 4, the relationship in which the detection intensity sinusoidally changes with respect to the amount of phase shift is represented by a continuous curve. However, the actually observed data are in a discrete form, and the continuous sinusoidal wave is reproduced from the observed data by the least-square method or other appropriate methods. To this end, it is necessary to detect the intensity with at least three different amounts of phase shift.

Subsequently, in Step 35, whether or not the value of k has reached $m_{max}$ is determined. At this stage, k=1 and has not reached $m_{max}$ (in the present example, $m_{max}$=3). Therefore, the determination result in Step 35 is "NO". When the result is "NO", the operation proceeds to Step 36, where the value of k is increased by one, to "2". The operation to be performed when the determination result in Step 35 is "YES" will be described later.

Next, the operation returns to Step 33. At each timing when the phase of the vibration of the vibrator 12 is $[\phi_0+2\pi(k-1)/m_{max}]$ in which k=2, i.e., $[\phi_0+2\pi/3]\equiv\phi_1$, the signal generator 11 transmits a pulse signal to the pulse laser light source 13. At the timing of the reception of the pulse signal, the pulse laser light source 13 repeatedly illuminates the surface of the test object S with the illumination light, which is a pulsed laser light. While the phase of the illumination light reflected at point A is sequentially changed (shifted) to at least three values by the phase shifter 153, each detection element of the image sensor 155 detects the intensity of the interference light composed of the illumination light reflected by point A and passing through the phase shifter 153 (and other related elements) and the illumination light reflected by point B (Step 34).

The middle drawing in FIG. 4 graphically shows the amount of phase shift by the phase shifter 153 and the intensity of the interference light detected by a detection element of the image sensor 155 when the phase of the vibration of the vibrator 12 is $\phi_1$. A comparison of the upper drawing and the middle drawing in FIG. 4 demonstrates that the peak positions of the intensity of the interference light in the two drawings differ from each other by $\delta\phi_1-\delta\phi_0$. This difference indicates that the phase difference between the optical path from point A and the one from point B has changed due to the difference in the phase of the vibration at the point in time of the detection. This change in the phase difference between the optical paths indicates that the relative displacement between points A and B in the off-plane direction has changed.

After the operation in Step 34 at k=2 has been completed, the determination result in Step 35 is still "NO" since the value of k has not reached $m_{max}$ (=3) yet. Therefore, in Step 36, the value of k is increased by one, to "3". The operation subsequently returns to Step 33. At each timing when the phase of the AC electric signal is $[\phi_0+2\pi(k-1)/m_{max}]$ in which k=3, i.e., $[\phi_0+4\pi/3]\equiv\phi_2$, the pulse laser light source 13 repeatedly illuminates the surface of the test object S with the illumination light, which is a pulsed laser light, and each detection element of the image sensor 155 detects the intensity of the interference light (Step 34). Thus, as shown in the lower drawing in FIG. 4, the relationship between the amount of phase shift by the phase shifter 153 and the intensity of the interference light when the phase of the AC electric signal is $\phi_2$ is obtained.

Subsequently, in Step 35, since the value of k is 3 and has reached $m_{max}$, the determination result is "YES", and the operation proceeds to Step 37. In Step 37, the transmission of the AC electric signal of frequency $f_i$ from the signal generator 11 to the vibrator 12 is discontinued. Consequently, the vibrator 12 stops vibrating.

Subsequently, in Steps 38 and 39, the vibration state (amplitude and phase) of the elastic wave at each point within the measurement area is determined by the following operations: Initially, for each detection element of the image sensor 155, the maximum output phase shifts $\delta\phi_0$, $\delta\phi_1$ and $\delta\phi_2$ at which the output of the detection element is maximized within the period in which the amount of phase shift was changed by the phase shifter 153 are determined at each of the three vibration phases of $\phi_0$, $\phi_1$ and $\phi_2$, respectively (see the upper, middle and lower graphs in FIG. 4). Furthermore, the differences between the maximum output phase shifts at the different phases of vibration, i.e., ($\delta\phi_1-\delta\phi_0$), ($\delta\phi_2-\delta\phi_1$) and ($\delta\phi_0-\delta\phi_2$), are determined (Step 38). These three differences of the maximum output phase shifts show three relative displacements of points A and B in the off-plane direction by means of two sets of data obtained at different phases of the vibration of the vibrator 12 (at different points in time). Based on these three relative displacements, the values of the following three parameters can be obtained for each point within the measurement area: the amplitude of the vibration, phase of the vibration, and central value (DC component) of the vibration (Step 39).

Based on the values of the amplitude and phase of the vibration at each point thus obtained, the image creator 161 creates data of an image (Step 40). For example, the larger the amplitudes of the measurement points are, the more suitable the image data is for creating data having higher luminance values of the pixels corresponding to the measurement points, or data showing the image with a different brightness or different color according to a difference in the amplitude of the vibration. The created image data is stored in the storage unit 17.

With the previously described operation, the measurement at one frequency $f_i$ (Step 3) is completed. Next, in Step 4, whether or not the value of i has reached h, i.e., whether or not the measurements for all frequencies $f_1$–$f_h$ have been completed, is determined. If the determination result in Step 4 is "NO", the value of i is increased by one (Step 5), and the operation returns to Step 3 to perform the operations of Steps 31 through 40 for the next frequency. If the determination result in Step 4 is "YES", i.e., when the measurements for all of the h frequencies have been completed, the operation proceeds to Step 6.

In Step 6, based on the image data created for each frequency $f_i$–$f_h$, the image creator 161 displays, on the display unit 19, an image showing the distribution of the displacements within the measurement area for each frequency. In this image created at each frequency in this step, the displacement values at the respective points within the measurement area may be directly used, or values from which a displacement due to the standing wave, noise components or other unnecessary factors have been removed by data processing may also be used. The latter image is more preferable since it shows almost equal values within an area where no defect is present, thereby making defects more noticeable.

The image to be displayed on the display unit 19 may be an image separately displayed for each frequency (FIG. 5A), or it may be a single image in which a plurality of images obtained at a plurality of frequencies are superposed on each other (superposed image; FIG. 5B). It is also possible to display both the images prepared for each frequency and the superposed image on the display unit 19.

Figure 5A:
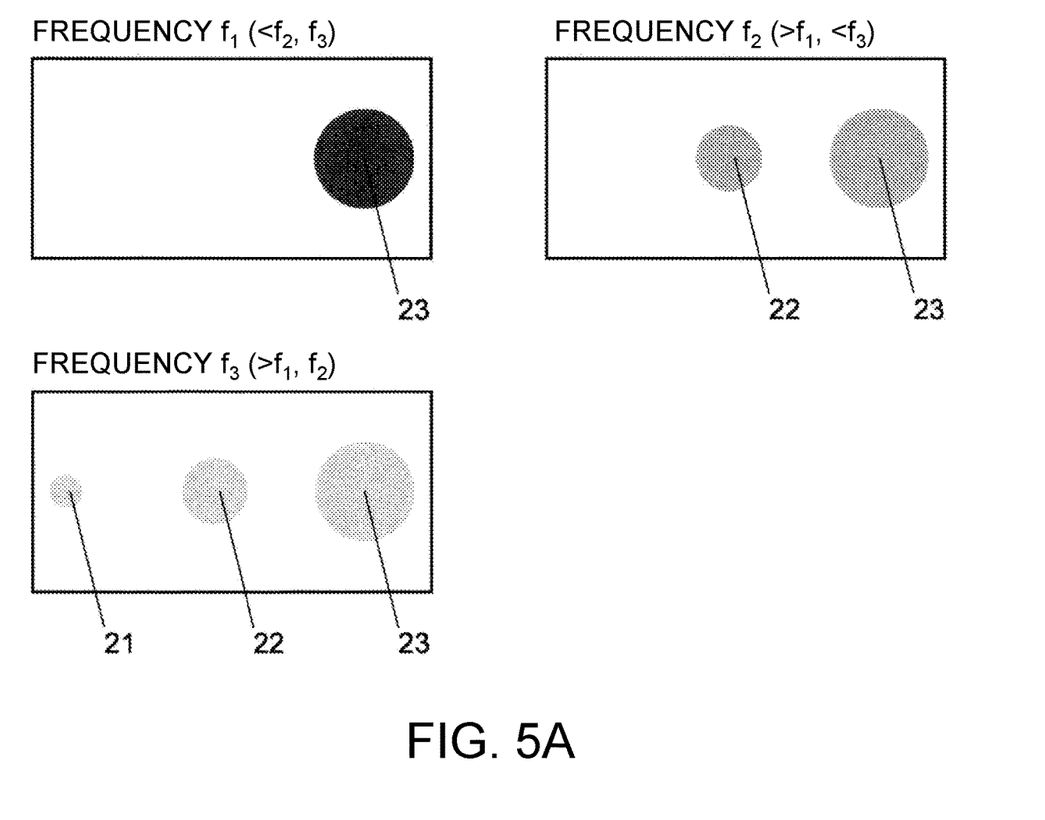
FIG. 5A is a diagram showing examples of the images obtained in the defect detection device according to the present embodiment.
Figure 5B:
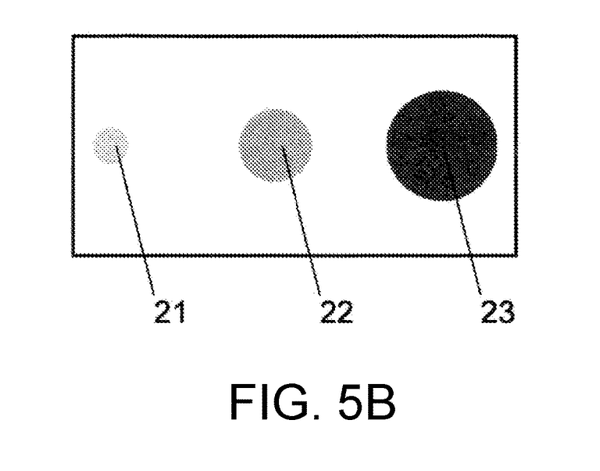
FIG. 5B is a diagram showing another example of the image obtained in the defect detection device according to the present embodiment.

In the example schematically shown in FIG. 5A, all of the three defects 21, 22 and 23 are visible in the image obtained at the highest frequency $f_3$. However, this image is fainter than those obtained at the lower frequencies $f_1$ and $f_2$. On the other hand, in the image obtained at the lowest frequency $f_1$, the largest defect 23 is more clearly visible than in the images obtained at the higher frequencies $f_2$ and $f_3$, whereas the defects 21 and 22, which are smaller than the defect 23, are invisible.

By comparison, in the example schematically shown in FIG. 5B, since the three images respectively obtained at the frequencies $f_1$, $f_2$ and $f_3$ are superposed on each other, the largest defect 23 is clearly visible, and the smaller defects 21 and 22 is also visible.

The previously described images which are separately displayed for each frequency (e.g., FIG. 5A) have the advantage that a more appropriate image can be selected depending on the type of defect present in or on the test object in such a manner that an image obtained with a low frequency is selected for a comparatively large defect, while an image obtained with a high frequency is selected for a small defect. On the other hand, the superposed image (e.g., FIG. 5B) has the advantage that it allows the user to instantaneously recognize both a comparatively large defect detected with a high signal-to-noise ratio by using a low frequency, and a small defect which was not overlooked but was detected by using a high frequency.

With the previously described operation, the entire sequence of the operations of the defect detection device and method according to the present embodiment is completed.

MODIFIED EXAMPLE

The present invention is not limited to the previous embodiment. It can be changed or modified in various forms.

For example, a speckle interferometer may be employed in place of the speckle-shearing interferometer 15 used in the previous embodiment. In the case of using a speckle interferometer, a portion of the pulse laser light emitted from the pulse laser light source 13 is split from the illumination light by a beam splitter or similar element to extract reference light. This reference light is made to interfere with the illumination light reflected by the surface of the test object S.

Figure 6:
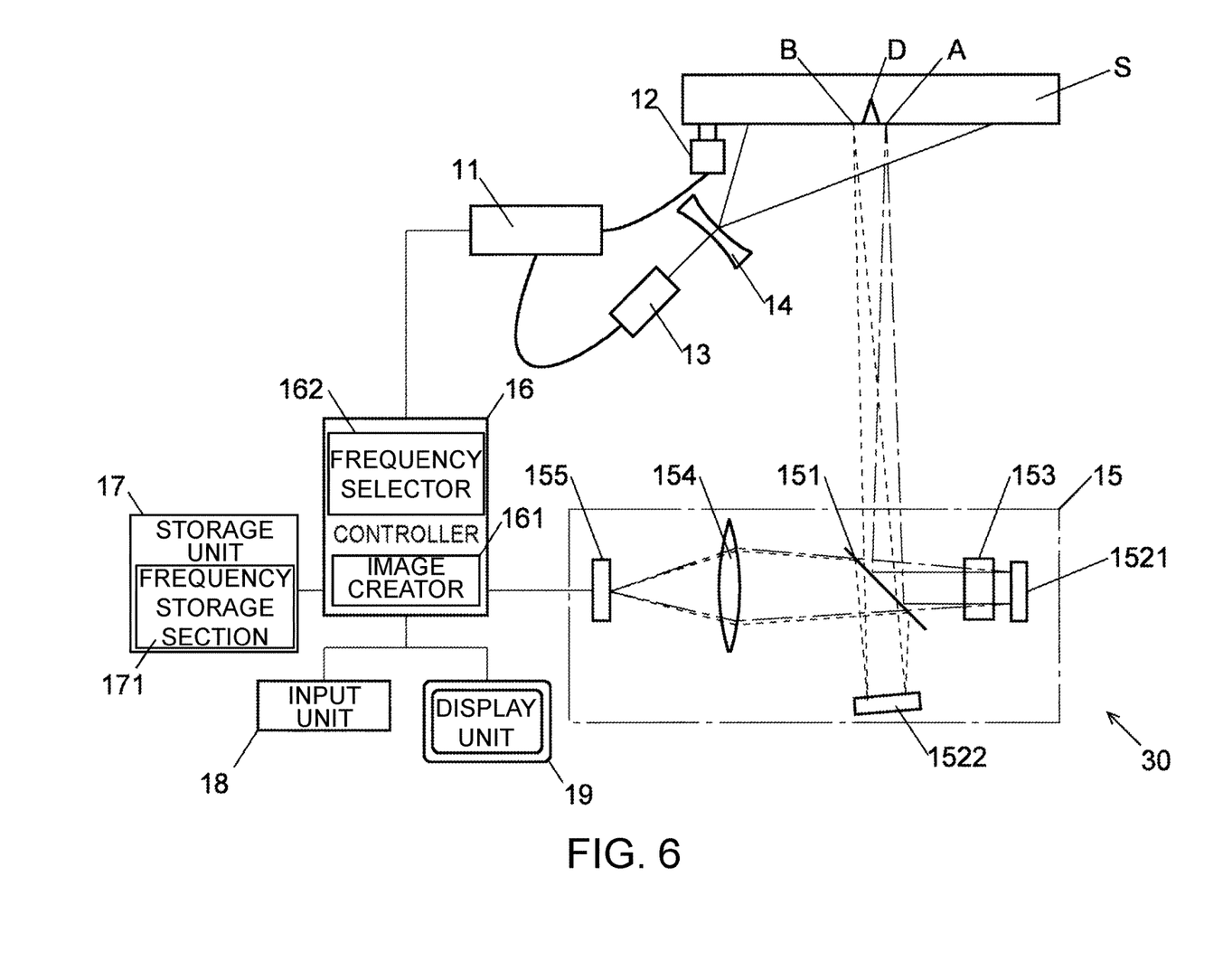
FIG. 6 is a schematic configuration diagram showing a modified example of the defect detection device according to the present invention.

The plurality of frequencies used in the previous embodiment are a plurality of frequencies entered by the user or determined beforehand (including the case of preparing a plurality of sets of frequencies and allowing the user to select one set). Alternatively, the plurality of frequencies may be determined by performing a preliminary experiment for each test object according to the following configuration. As shown in FIG. 6, the defect detection device 30 according to this modified example additionally includes a frequency selector 162 as a functional block in the controller 16 of the defect detection device 10 according to the previous embodiment.

The defect detection device 30 including the frequency selector 162 performs the following operation in place of Step 1 in the operation of the defect detection device 10 according to the previous embodiment.

Initially, the signal generator 11 supplies the vibrator 12 with an AC electric signal while varying its frequency so that a plurality of kinds of preliminary measurement vibrations whose frequencies are different from each other are sequentially given from the vibrator 12 to the test object S, where the number of kinds of preliminary measurement vibrations is larger than that of the kinds of vibrations to be given to the test object S in the actual measurement. Meanwhile, the frequency selector 162 obtains the waveforms of the AC voltage and the AC current supplied from the signal generator 11 to the vibrator 12 and determines a frequency at which the difference between the phase of the AC voltage and that of the AC current (phase difference) is equal to or smaller than a predetermined value. A small value of this phase difference means that the vibrator 12 is oscillating at a frequency close to the resonance frequency of the measurement system including the vibrator 12 and the test object S, thereby efficiently inducing vibrations in the test object S (see Patent Literature 2). Accordingly, the frequency selector 162 displays, on the display unit 19, a plurality of frequencies as recommended frequencies at which the phase difference determined in the preliminary experiment using the preliminary measurement vibrations was equal to or smaller than the predetermined value, where the "plurality" is not always equal to the number of frequencies to be used in the actual defect detection measurement but may exceed that number. With the recommended frequencies thus displayed, the user performs an operation for selecting some or all of those frequencies, and the selected frequencies are set as the plurality of frequencies to be used in the actual defect detection measurement. By this setting, each of the measurements for a plurality of different frequencies can be performed in a favorable condition, with the vibration efficiently induced in the test object S. The operations of Step 2 and subsequent steps are identical to those of the defect detection device 10 according to the previous embodiment, and therefore, their descriptions are omitted.

In the modified example including the previously described frequency selector 162, the plurality of frequencies at which the phase difference determined by using the preliminary measurement vibrations is equal to or smaller than a predetermined value may be directly set as the plurality of frequencies to be used in the actual defect detection measurement, instead of displaying recommended frequencies on the display unit 19 and allowing the user to select some of them.

MODES

It is evident that the previously described illustrative embodiment is a specific example of the following modes of the present invention.
(Clause 1)
A defect detection device according to Clause 1 includes:
an exciter configured to induce an elastic wave in a test object by sequentially giving the test object a plurality of kinds of vibrations whose frequencies are different from each other;
an illuminator configured to perform stroboscopic illumination on a measurement area on the surface of the test object; and
a displacement measurer configured to control the timing of the stroboscopic illumination and the phase of the elastic wave for each of the plurality of kinds of vibrations so as to perform a batch measurement of displacements, in the off-plane direction of the surface, of the points within the measurement area at least at three phases of the elastic wave which are different from each other, using speckle interferometry or speckle-shearing interferometry.
(Clause 6)
A defect detection method according to Clause 6 includes:
a frequency-setting process for setting a plurality of frequencies which are different from each other;
an excitation process for inducing an elastic wave in a test object by giving a vibration having one of the plurality of frequencies to the test object;
an illumination process for performing stroboscopic illumination on a measurement area on a surface of the test object; and
a displacement measurement process for controlling a timing of the stroboscopic illumination and a phase of the elastic wave so as to perform a batch measurement of displacements, in an off-plane direction of the surface, of points within the measurement area at least at three phases of the elastic wave which are different from each other, using speckle interferometry or speckle-shearing interferometry,
where the excitation process, the illumination process and the displacement measurement process are sequentially performed for each of the plurality of frequencies after the frequency-setting process is performed.

In the defect detection device according to Clause 1 and the defect detection method according to Clause 6, a plurality of frequencies which are different from each other are previously set. A plurality of kinds of vibrations having those frequencies which are different from each other are sequentially given to the test object so as to obtain, for each frequency, the displacement in the off-plane direction of each point within the measurement area on the surface of the test object. Therefore, the user does not need to perform the frequency-setting operation for each frequency, so that the time and labor of the user can be reduced.

As for the setting of the frequencies of the plurality of kinds of vibrations (i.e., the "plurality of frequencies" mentioned earlier), the user may enter and set all frequencies at one time before the measurement is initiated, or those frequencies may be set beforehand without requiring entry by the user.

By using at least one of the plurality of sets of data respectively obtained for a plurality of frequencies, a defect in the test object can be detected based on the displacement in the off-plane direction of each point within the measurement area at least at three phases which are different from each other. Specifically, if there is a discontinuous portion in the distribution of the displacements within the measurement area, it is possible to determine that a defect is present in that portion.
(Clause 2)
In the defect detection device according to Clause 2, which is one mode of the defect detection device according to Clause 1, the frequencies of the plurality of kinds of vibrations have values respectively determined by a plurality of terms of a single geometric progression.

It is commonly known that, when the same amount of vibration energy is given to the test object, the rate of change in the amplitude with respect to the frequency is inversely proportional to the frequency. By utilizing this characteristic, the defect detection device according to Clause 2, determines the aforementioned frequencies by a plurality of terms of a single geometric progression, i.e., $A_i = A_0 X^0$, $A_0 X^1, A_0 X^2 \ldots$, and $A_0 X^i$, where $A_0$ is the first term and X is the common ratio, whereby the amplitude values can be set at almost equal intervals.
(Clause 3)
In the defect detection device according to Clause 3, which is one mode of the defect detection device according to Clause 1, the exciter is further configured to sequentially give the test object a larger number of kinds of preliminary measurement vibrations whose frequencies are different from each other than the plurality of kinds of vibrations before giving the plurality of kinds of vibrations to the test object; and
the defect detection device further includes a frequency selector configured to select the frequencies of the plurality of kinds of vibrations from the frequencies of the larger number of kinds of preliminary measurement vibrations, based on the vibration state of the test object in each of the larger number of kinds of the preliminary measurement vibrations.

In the defect detection device according to Clause 3, a larger number of kinds of preliminary measurement vibrations than the plurality of kinds of vibrations are sequentially given from the exciter to the test object, and some of the frequencies of those larger number of kinds of preliminary measurement vibrations are selected as the frequencies of the plurality of kinds of vibrations based on the vibration state of each of those larger number of kinds of preliminary measurement vibrations. By this method, the frequencies of the plurality of kinds of vibrations to be used in the actual measurement can be appropriately selected. For example, from among the larger number of kinds of preliminary measurement vibrations, the frequencies of preliminary measurement vibrations in which the phase difference between the AC voltage of the AC electric signal supplied to the exciter and the AC current resulting from that voltage is equal to or smaller than a predetermined value may preferably be selected. A small value of the phase difference between the AC voltage of the AC electric signal thus supplied to the exciter and the resulting AC current means that the exciter is oscillating at a frequency close to the resonance frequency of the measurement system including the exciter and the test object, thereby efficiently inducing vibrations in the test object (see Patent Literature 2).
(Clause 4)

The defect detection device according to Clause 4, which is one mode of the defect detection device according to one of Clauses 1 to 3, further includes:

an image creator configured to create an image showing a distribution of the displacements within the measurement area, based on the displacement in the off-plane direction of each point within the measurement area at least at the three phases at each of the plurality of frequencies; and a display section configured to display a plurality of the images respectively created at the plurality of frequencies.

In the defect detection device according to Clause 4, since the (plurality of) images respectively created at the plurality of frequencies are displayed on the display section, the user can select an appropriate image (obtained at an appropriate frequency) from those images and determine whether or not a defect is present.

In the image created at each frequency of the vibration, the displacement values at the respective points within the measurement area may be directly used and displayed, or values from which a displacement due to the standing wave, noise components or other unnecessary factors have been removed by data processing may also be used and displayed. The latter image is more preferable since it shows almost equal values within an area where no defect is present, thereby making defects more noticeable.
(Clause 5)

In the defect detection device according to Clause 5, which is one mode of the defect detection device according to Clause 4, the display section is configured to display one image in which a plurality of images respectively created at the plurality of frequencies are superposed on each other, along with or in place of the plurality of images respectively created at the plurality of frequencies.

The defect detection device according to Clause 5 displays a single image in which a plurality of images respectively created in the plurality of frequencies are superposed on each other. Therefore, both a comparatively large defect detected with a high signal-to-noise ratio by using a low frequency, and a small defect which was not overlooked but was detected by using a high frequency can be shown in an instantaneously recognizable manner in the same image.

The invention claimed is:

1. A defect detection device, comprising:
   an exciter configured to induce elastic waves in a test object by sequentially giving the test object a plurality of kinds of vibrations whose frequencies are different from each other and are predetermined to have values respectively determined by a plurality of terms of a single geometric progression;
   an illuminator configured to perform stroboscopic illumination on a measurement area on a surface of the test object; and
   a displacement measurer configured to perform a batch measurement of displacements, in an off-plane direction of the surface, of points within the measurement area at least at three phases of the elastic wave which are different from each other, using speckle interferometry or speckle-shearing interferometry, while a timing of the stroboscopic illumination and a phase of the elastic wave for each of the plurality of kinds of vibrations are controlled.

2. The defect detection device according to claim 1, wherein:
   the exciter is further configured to sequentially give the test object a larger number of kinds of preliminary measurement vibrations whose frequencies are different from each other than the plurality of kinds of vibrations before giving the plurality of kinds of vibrations to the test object; and
   the defect detection device further includes a frequency selector configured to select the frequencies of the plurality of kinds of vibrations from the frequencies of the larger number of kinds of preliminary measurement vibrations, based on a vibration state of the test object in each of the larger number of kinds of the preliminary measurement vibrations.

3. The defect detection device according to claim 1, further comprising:
   an image creator configured to create an image showing a distribution of the displacements within the measurement area, based on the displacement in the off-plane direction of each point within the measurement area at least at the three phases at each of the plurality of frequencies; and
   a display section configured to display a plurality of the images respectively created at the plurality of frequencies.

4. The defect detection device according to claim 3, wherein the display section is configured to display one image in which a plurality of images respectively created at the plurality of frequencies are superposed on each other, along with or in place of the plurality of images respectively created at the plurality of frequencies.

5. A defect detection method, comprising:
   an excitation process for inducing an elastic wave in a test object by giving, to the test object, a vibration having one of a plurality of frequencies that are different from each other and are predetermined to have values respectively determined by a plurality of terms of a single geometric progression;
   an illumination process for performing stroboscopic illumination on a measurement area on a surface of the test object; and
   a displacement measurement process for performing a batch measurement of displacements, in an off-plane direction of the surface, of points within the measurement area at least at three phases of the elastic wave which are different from each other, using speckle interferometry or speckle-shearing interferometry, while a timing of the stroboscopic illumination and a phase of the elastic wave are controlled,
   wherein the excitation process, the illumination process and the displacement measurement process are sequentially performed for each of the plurality of frequencies.

* * * * *